United States Patent
Haruyama et al.

(10) Patent No.: US 10,046,705 B2
(45) Date of Patent: Aug. 14, 2018

(54) BLIND SPOT ASSIST DEVICE

(71) Applicant: Nippon Seiki Co., Ltd., Niigata (JP)

(72) Inventors: Kanae Haruyama, Niigata (JP); Masato Obata, Niigata (JP); Yuichi Takahashi, Niigata (JP); Keiichi Nagano, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 49 days.

(21) Appl. No.: 15/107,755

(22) PCT Filed: Dec. 12, 2014

(86) PCT No.: PCT/JP2014/082915
§ 371 (c)(1),
(2) Date: Jun. 23, 2016

(87) PCT Pub. No.: WO2015/098557
PCT Pub. Date: Jul. 2, 2015

(65) Prior Publication Data
US 2016/0318448 A1 Nov. 3, 2016

(30) Foreign Application Priority Data

Dec. 25, 2013 (JP) .................................. 2013-266402
Dec. 25, 2013 (JP) .................................. 2013-267123

(51) Int. Cl.
*B60R 1/08* (2006.01)
*B60R 1/04* (2006.01)
(Continued)

(52) U.S. Cl.
CPC ................. *B60R 1/081* (2013.01); *B60R 1/04* (2013.01); *B60R 1/10* (2013.01); *G02B 17/006* (2013.01); *G02B 27/1066* (2013.01)

(58) Field of Classification Search
CPC B60R 1/081; B60R 1/04; B60R 1/025; B60R 1/10; B60R 1/082; B60R 1/08; G02B 17/006; G02B 27/1066
(Continued)

(56) References Cited

U.S. PATENT DOCUMENTS 3,704,062 A * 11/1972 Toy ........................... B60R 1/10
359/633
3,827,788 A 8/1974 Clark

FOREIGN PATENT DOCUMENTS

GB          605270 A       7/1948
GB          680686 A       10/1952
(Continued)

OTHER PUBLICATIONS

Machine English language translation of foreign patent document Matsumoto Shozo JP 61-018956.*
(Continued)

*Primary Examiner* — Marin Pichler
(74) *Attorney, Agent, or Firm* — McDermott Will & Emery LLP

(57) ABSTRACT

Provided is a blind spot assist device capable of more easily showing the image of a blind-spot zone continuously with the image directly viewed by a viewer. The blind spot assist device shows the image of the blind-spot zone blocked by an obstacle, and is provided with a pair of parallel plane mirrors to which light representing the image is incident, the pair of parallel plane mirrors comprising a semitransparent plane mirror and a plane mirror opposed to each other. The semitransparent plane mirror is provided on the viewer side for reflecting part of the light and transmitting part of the light. The plane mirror reflects the light to the semitransparent plane mirror. The pair of plane parallel mirrors is provided in such a manner that the width in a direction (Continued)

perpendicular to the travel direction of the light decreases gradually toward the travel direction of the light.

7 Claims, 10 Drawing Sheets

(51) Int. Cl.
*B60R 1/10* (2006.01)
*G02B 17/00* (2006.01)
*G02B 27/10* (2006.01)

(58) Field of Classification Search
USPC ........ 359/839, 844, 850, 861, 865, 871, 402
See application file for complete search history.

(56) References Cited

FOREIGN PATENT DOCUMENTS

| | | |
|---|---|---|
| GB | 2461045 A | 12/2009 |
| JP | 61-18956 U | 2/1986 |
| JP | 61-70161 U | 5/1986 |
| JP | H07-015441 U | 3/1995 |
| JP | 2001-004925 A | 1/2001 |
| JP | 2005-199844 A | 7/2005 |
| JP | 2006-231998 A | 9/2006 |
| JP | 2006-248365 A | 9/2006 |
| JP | 2015-020669 A | 2/2015 |
| JP | 2015-024798 A | 2/2015 |

OTHER PUBLICATIONS

International Search Report dated Mar. 10, 2015, issued in International Application No. PCT/JP2014/082915. (w/English translation).
A concise explanation of JP61-70161 (reference filed Jun. 23, 2016).
A concise explanation of JP61-18956 (reference filed Jun. 23, 2016).
Extended European Search Report dated Dec. 21, 2017, issued in European Application No. 15806319.8 (with English translation).
Final Office Action issued in related U.S. Appl. No. 15/317,371 dated Mar. 7, 2018.
Office Action issued in related U.S. Appl. No. 15/317,371 dated Nov. 17, 2017.
International Search Report dated Jul. 7, 2015, issued in International Application No. PCT/JP2015/065493 (with English translation).

\* cited by examiner (a)

(b)

(a)

(b)

(a)

(b)

BLIND SPOT ASSIST DEVICE

CROSS-REFERENCE TO RELATED APPLICATIONS

This application is the U.S. National Phase of PCT/JP2014/082915 filed Dec. 12, 2014, which claims priority to Japanese Patent Application No. 2013-266402 filed Dec. 25, 2013 and Japanese Patent Application No. 2013-267123 filed Dec. 25, 2013. The subject matter of each is incorporated herein by reference in entirety.

TECHNICAL FIELD

The present invention relates to a blind spot assist device for showing an image of a blind-spot zone blocked by an obstacle such as a front pillar of a vehicle.

BACKGROUND ART

Conventionally, a viewing device for showing a blind spot caused by an obstacle such as a front pillar of a vehicle has been known in PTL 1, for example. The viewing device includes a first mirror for showing the front of the vehicle and a second mirror for reflecting the light incident on the first mirror to a driver side. In the viewing device, the first mirror and/or the second mirror can be adjusted in such a manner that an image viewed by a driver through direct viewing areas having the front pillar of the vehicle therebetween and an image shown on the second mirror are continuous.

CITATION LIST

Patent Literature

PTL 1: JP-A-2006-231998

SUMMARY OF INVENTION

Technical Problem

However, in the viewing device according to PTL 1, it is necessary to adjust a positional relation between the first mirror and the second mirror in such a manner that the first mirror on which light from a blind spot is incident does not block the second mirror and the scenery, as viewed from the driver. Accordingly, there is a problem that an installation work or an adjustment work is complicated.

The present invention has been made in consideration of the above problem and an object thereof is to provide a blind spot assist device capable of more easily showing an image of a blind-spot zone continuously with an image directly viewed by a viewer.

Solution to Problem

In order to achieve the above object, a blind spot assist device according to the present invention shows an image of a blind-spot zone blocked by an obstacle. The blind spot assist device includes a pair of mirrors on which light representing the image is incident. The pair of mirrors includes a semitransparent mirror and a mirror opposed to each other. The semitransparent mirror is provided on a viewer side for reflecting a part of the light and transmitting a part of the light, and the mirror reflects the light to the semitransparent mirror.

Advantageous Effects of Invention

According to the present invention, it is possible to more easily show an image of a blind-spot zone continuously with an image directly viewed by a viewer.

BRIEF DESCRIPTION OF DRAWINGS

FIG. 5(*a*) is a perspective view showing the pair of parallel plane mirrors, as viewed from a viewer, and FIG. 5(*b*) is a front view showing a positional relation between the viewer and the pair of parallel plane mirrors.

DESCRIPTION OF EMBODIMENTS

A blind spot assist device according to an embodiment of the present invention will be described with reference to the drawings.

Figure 1:
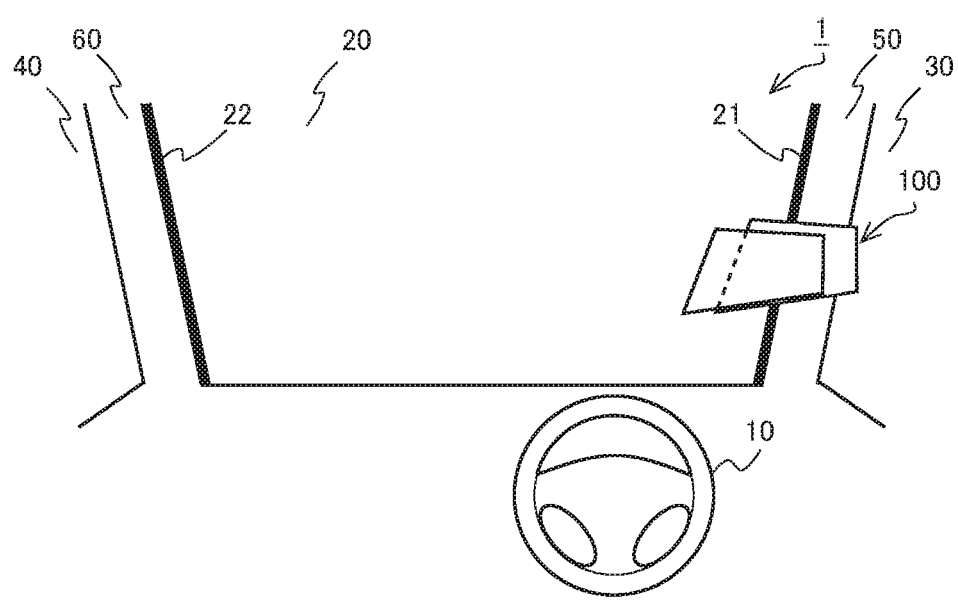
FIG. 1 is a view showing an overview of a region around a driver's seat of a vehicle, on which a blind spot assist device according to an embodiment of the present invention is disposed.

FIG. 1 is a view showing an overview of a region around a driver's seat of a vehicle 1, on which a blind spot assist device 100 according to the present embodiment is disposed. As shown in FIG. 1, the vehicle 1 includes a steering 10, a windshield glass 20, side glasses 30, 40, and front pillars 50, 60. Further, reference numerals 21, 22 represent black light-shielding ceramic parts which are printed and formed on a peripheral portion of the windshield glass 20.

In the vehicle 1, a viewer (mainly, a driver) directly views the scenery in the region where the windshield glass 20 (except for the black ceramic part 21) and the side glasses 30, 40 are disposed whereas a field of view of the viewer is blocked by the front pillars 50, 60 and the black ceramic parts 21, 22 in the region where the front pillars 50, 60 and the black ceramic parts 21, 22 are disposed, and hence, there occurs a blind-spot zone where the viewer cannot directly view the scenery. That is, the front pillars 50, 60 and the black ceramic parts 21, 22 correspond to the obstacles in the present invention.

Subsequently, a configuration of the blind spot assist device 100 according to the present embodiment will be described with reference to FIG. 1 to FIG. 3. Meanwhile, FIG. 2 is a plan view showing an overview of the blind spot assist device 100, and FIG. 3 is a plan view showing the blind spot assist device 100.

Figure 2:
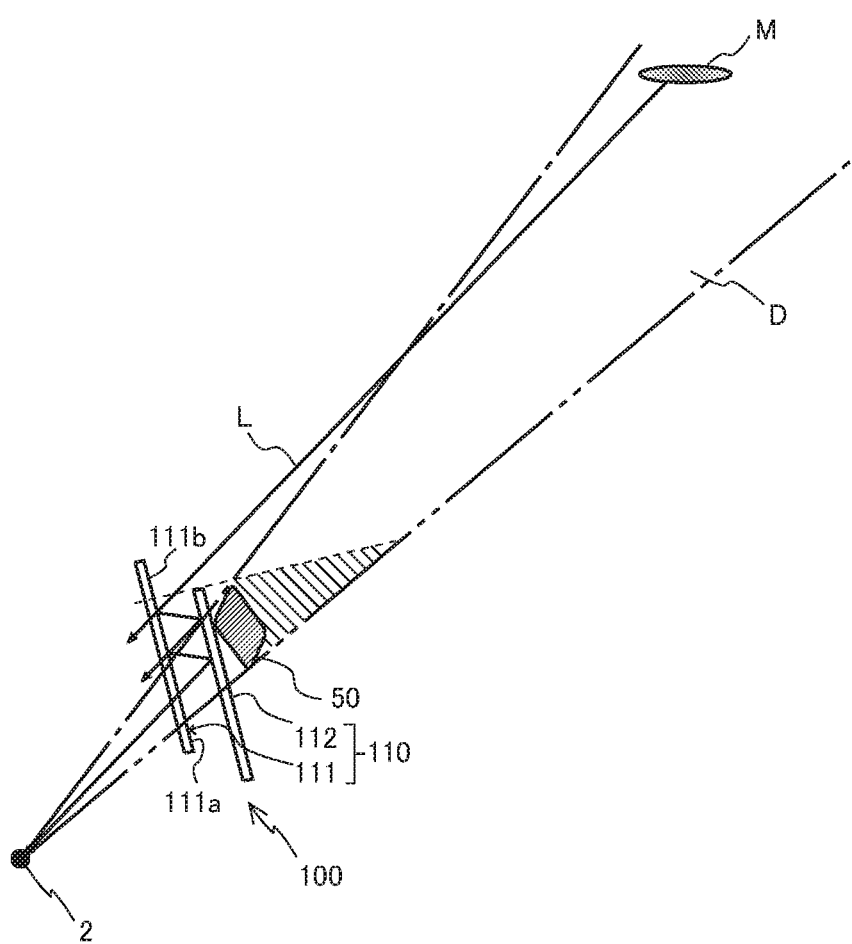
FIG. 2 is a plan view showing an overview of the blind spot assist device.

As shown in FIG. 1 and FIG. 2, the blind spot assist device 100 is placed at the front pillar 50 on the right side (driver side) as viewed from the viewer side through a case body (not shown) to be described in detail later and is adapted to show an image of a blind-spot zone blocked by the front pillar 50 and the black ceramic part 21. Meanwhile, the blind spot assist device 100 is disposed so as to face the front pillar 50 and the black ceramic part 21, as viewed from the viewer.

Figure 3:
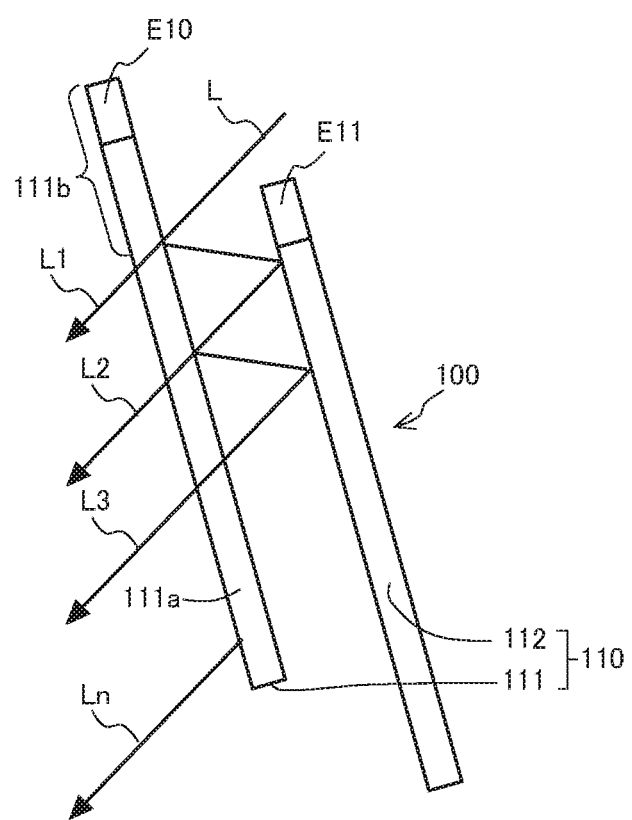
FIG. 3 is a plan view showing the blind spot assist device.

As shown in FIG. 2 and FIG. 3, the blind spot assist device 100 includes a pair of parallel plane mirrors (a pair of mirrors) 110.

The pair of parallel plane mirrors 110 is configured in such a manner that a semitransparent plane mirror (semitransparent mirror) 111 for reflecting a part of the light incident thereon and transmitting a part of the light and a plane mirror (mirror) 112 are disposed in parallel so as to face each other. Meanwhile, the semitransparent plane mirror 111 and the plane mirror 112 are fixed in a positional relation parallel to each other by being disposed in a case body (not shown). Meanwhile, so long as the pair of mirrors is disposed so as to face each other, the pair of mirrors of the present invention may not be arranged in a complete parallel state. Further, the pair of mirrors may be a curved mirror, instead of the plane mirror.

The semitransparent plane mirror 111 is provided on the viewer side. The semitransparent plane mirror 111 is configured in such a manner that a metal such as aluminum is deposited on a surface of a substrate made of, for example, a translucent resin material such as polyethylene terephthalate, polycarbonate, polyethylene and acrylic, and hence, a reflectivity adjustment layer is formed so as to have a desired reflectivity. The reflectivity (transmittance) is adjusted, depending on the thickness and type or the like of the reflectivity adjustment layer. A light quantity ratio (the transmitted light to the reflected light) of the transmitted light and the reflected light in the semitransparent plane mirror 111 of the present embodiment is equal to 1:9. Meanwhile, the semitransparent plane mirror 111 may be formed by coating a dielectric multilayer film on the surface of the substrate. The semitransparent plane mirror 111 has a base portion 111a facing the plane mirror 112 and an extension portion 111b extending from the base portion 111a. The semitransparent plane mirror 111 and the plane mirror 112 are arranged so as to have a different height in the horizontal direction.

The plane mirror 112 is configured in such a manner that the plane (reflective surface) is arranged to be parallel with the plane (semitransparent reflective surface) of the semitransparent plane mirror 111. For example, the plane mirror 112 is a plane aluminum deposited mirror which is formed by depositing the metal such as aluminum on the surface of the substrate made of the translucent resin material described above.

Subsequently, an operation of the pair of parallel plane mirrors 110 will be described with reference to FIG. 2 and FIG. 3. Meanwhile, FIG. 2 shows a state where a viewer is seated on a driver's seat, and a reference numeral 2 represents a viewpoint (eye point) of the viewer.

In FIG. 2, a blind-spot zone D, which is blocked by the front pillar 50 (also including the black ceramic part 21 although not shown), is caused on the front field of view of the viewer (viewpoint 2). Therefore, it is not possible to view an object M present in the blind-spot zone D directly from the viewpoint 2.

On the other hand, a light L from the object M is incident on the pair of parallel plane mirrors 110 and is repeatedly reflected between the pair of parallel plane mirrors 110. Then, a portion of the light L is emitted from the pair of parallel plane mirrors 110 (transmitted through the semitransparent plane mirror 111). Meanwhile, the light, which is incident on the pair of parallel plane mirrors 110 and is repeatedly reflected between the pair of parallel plane mirrors 110, has a slope relative to the parallel planes of the pair of parallel plane mirrors 110. A portion of the light L emitted from the pair of parallel plane mirrors 110 reaches the viewpoint 2. Therefore, it is possible to view an image of the object M shown on the plane mirror 112 continuously with the scenery which can be viewed directly from the viewpoint 2, through the semitransparent plane mirror 111. Meanwhile, for a partial area (hatched portion) of the blind-spot zone D, which is located on the rear side of the front pillar 50, light from this area cannot be incident on the pair of parallel plane mirrors 110, and hence, an image of this area cannot be shown by the pair of parallel plane mirrors 110. However, for most areas other than the area, an image of the blind-spot zone D can be shown by the pair of parallel plane mirrors 110.

Meanwhile, when the image of the blind-spot zone D is shown by the pair of parallel plane mirrors 110, the viewer arranges the blind spot assist device 100 at an arbitrary height (height matching the viewpoint 2) of the front pillar 50 by adjusting the angle of the pair of parallel plane mirrors 110 so that the image of the blind-spot zone D is shown on the pair of parallel plane mirrors 110, i.e., so that the light L from the blind-spot zone D reaches the viewpoint 2. Since the semitransparent plane mirror 111 and the plane mirror 112 are fixed in a positional relation parallel to each other, the pair of parallel plane mirrors 110 can be simultaneously arranged by a single arrangement work, and the angle of the pair of parallel plane mirrors 110 can be simultaneously adjusted by a single adjustment work.

Here, a light quantity ratio of the transmitted light and the reflected light in the semitransparent plane mirror 111 is equal to 1:9. Therefore, as shown in FIG. 3, when the light L is incident on the semitransparent plane mirror 111 for the first time, a light quantity of a light L1, which is the first emitted light (the first transmitted light from the semitransparent plane mirror 111) from the pair of parallel plane mirrors 110, is equal to 1/10 of that of the light L which is incident on the semitransparent plane mirror 111 for the first time. Since the light L1 is different from the light L only in the light quantity, the light L1 shows the image of the object M, similar to the light L. On the other hand, the light L, which is incident on the semitransparent plane mirror 111 for the first time, is reflected in the order of the semitransparent plane mirror 111 and the plane mirror 112, and then, is incident on the semitransparent plane mirror 111 again (for the second time). When the light L is incident on the semitransparent plane mirror 111 for the second time, a light L2 representing the image of the object M is emitted from the pair of parallel plane mirrors 110, similar to the case of the first time. Further, the light L, which is incident on the semitransparent plane mirror 111 for the second time, is reflected in the order of the semitransparent plane mirror 111 and the plane mirror 112, and then, is incident on the semitransparent plane mirror 111 again (for the third time). When the light L is incident on the semitransparent plane mirror 111 for the third time, a light L3 representing the image of the object M is emitted from the pair of parallel plane mirrors 110, similar to the case of the first and second times.

In this way, since the light L is repeatedly reflected between the pair of parallel plane mirrors 110, lights L1 to Ln representing the image of the object M are emitted from a single parallel plane mirror 110 when the light L is incident n times on the semitransparent plane mirror 111. That is, the light L representing n images of the object M is emitted along the left and right directions of the eyes of the viewer from the pair of parallel plane mirrors 110. Therefore, the viewer can view the image of the object M over a wide range in the left and right direction.

Meanwhile, the light quantity ratio of the transmitted light and the reflected light in the semitransparent plane mirror 111 is properly determined in consideration of the relation between decrease in brightness of the light L with increase in the number of reflections, and brightness of the light L at initial incidence. For example, the light quantity ratio of the transmitted light and the reflected light may be equal to 1:1 or 1:4, or the like.

Subsequently, a planar shape of the pair of parallel plane mirrors 110 will be described. FIG. 4(a) is a front view of the blind spot assist device 100, as seen from the front, and FIG. 4(b) is a side view of the blind spot assist device 100, as seen from the emission side (a travel direction side of the light L). Meanwhile, a case body 120 is not shown in FIG. 4(a).

As shown in FIG. 4(a), respective planes (the semitransparent reflective surface and the reflective surface) of the semitransparent plane mirror 111 and the plane mirror 112 are formed in a substantially wedge shape in such a manner that widths W1, W2 in a direction perpendicular to a travel direction (indicated by an arrow in FIG. 4(a)) of the light L in the pair of parallel plane mirrors 110 decrease gradually toward the travel direction of the light L in the pair of parallel plane mirrors 110. Further, the semitransparent plane mirror 111 and the plane mirror 112 have a planar shape similar to each other (including the case where the planar shape is substantially the same) and are formed in such a manner that the width W2 of the plane mirror 112 in the direction perpendicular to the travel direction of the light L in the pair of parallel plane mirrors 110 is greater than the width W1 of the semitransparent plane mirror 111 in the direction perpendicular to the travel direction of the light L in the pair of parallel plane mirrors 110 (W2>W1). The reason of forming the semitransparent plane mirror 111 and the plane mirror 112 in such a shape will be described in detail below. Further, an incidence-side end (lateral side on the incidence side) E10 of the semitransparent plane mirror 111 and an incidence-side end (lateral side on the incidence side) E11 of the plane mirror 112 are inclined along a glass surface of the windshield glass 20. This is intended to enable an arrangement close to the glass surface of the windshield glass 20.

As shown in FIG. 4(b), the semitransparent plane mirror 111 and the plane mirror 112 are fixed in a positional relation parallel to each other by being disposed in the case body 120.

The case body 120 is made of light-shielding resin material such as ABS. The case body 120 is a member which has a substantially U shape (an inverted C shape), as seen from the side of the incidence side, and has a bottom wall portion 121, an upper wall portion 122 and a side wall portion 123. The plane mirror 112 is attached to the side wall portion 123 of the case body 120, and the semitransparent plane mirror 111 is arranged parallel to the plane mirror 112 on the opening side of the case body 120 and is sandwiched by the bottom wall portion 121 and the upper wall portion 122. The bottom wall portion 121 and the upper wall portion 122 of the case body 120 are provided so as to cover a space between the semitransparent plane mirror 111 and the plane mirror 112 from below or above and serve as a light-shielding wall for shielding an external light which is incident on the pair of parallel plane mirrors 110 from below or above.

Figure 5:
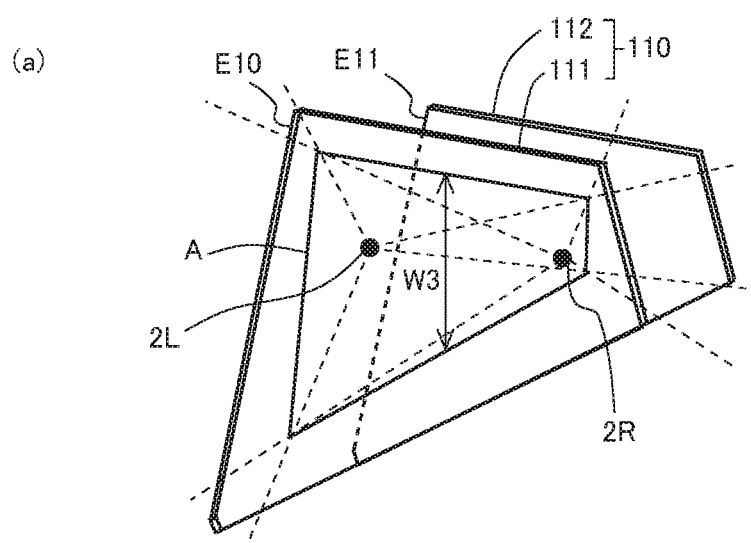
FIG. 5 is a view showing a pair of parallel plane mirrors of the blind spot assist device.
Figure 5:
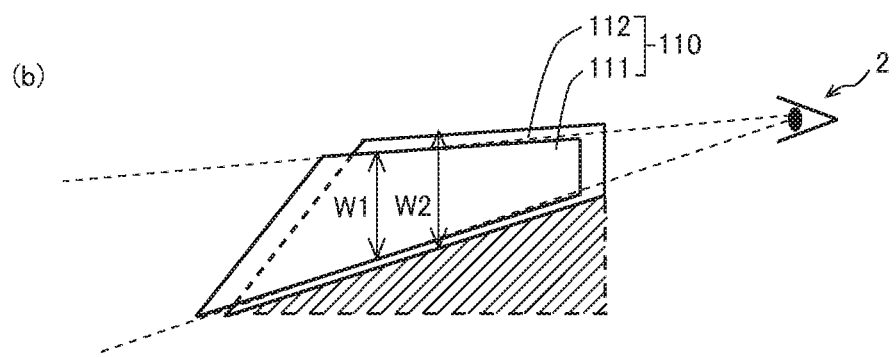

Subsequently, the reason of forming respective planes of the semitransparent plane mirror 111 and the plane mirror 112 in a substantially wedge shape in such a manner that the widths W1, W2 in the vertical direction decrease gradually toward the travel direction of the light L will be described with reference to FIG. 5.

The range of the image that can be actually viewed when the viewer views the image of the blind-spot zone D by the blind spot assist device 100 is determined by the position of the viewpoint 2, the installation position of the blind spot assist device 100, and the planar shape of the pair of parallel plane mirrors 110. Further, when the viewer actually views the image of the blind-spot zone D by the blind spot assist device 100, as shown in FIG. 2, the blind spot assist device 100 is installed between the obstacle such as the front pillar 50 on the depth side (the upper side in FIG. 2) and the viewer on the front side (the lower side in FIG. 2) in such a manner that the planes of the pair of parallel plane mirrors 110 are inclined in the depth direction relative to the viewer, and hence, the incidence side of the planes is far away from the viewer and the planes gradually approach the viewer toward the emission side (toward the travel direction of the light L in the pair of parallel plane mirrors 110). The reason is that a certain angle in the depth direction is required for the pair of parallel plane mirrors 110 in order to allow the light L from the blind-spot zone D to be incident thereon and to be emitted toward the viewer. FIG. 5(a) shows the semitransparent plane mirror 111 and the plane mirror 112, as seen from the viewer on the front side. Meanwhile, in FIG. 5(a), a reference numeral 2R indicates a right eye of the viewer and a reference numeral 2L indicates a left eye of the viewer. At this time, a field of view of the viewer is radially spread toward the depth direction, as indicated by a dotted line in FIG. 5(a). Therefore, when a distance between the viewer and the pair of parallel plane mirrors 110 is relatively close, such as when the blind spot assist device 100 is installed in the front pillar 50, the range (hereinafter, referred to as a "visible range A") that the viewer can view the image of the blind-spot zone D by the pair of parallel plane mirrors 110 is defined in such a manner that the width W3 in the vertical direction (in the direction perpendicular to the travel direction of the light L in the pair of parallel plane mirrors 110) is large on the incidence side located at the depth side and the width W3 in the vertical direction is gradually decreased toward the emission side (toward the travel direction of the light L in the pair of parallel plane mirrors 110) located at the front side. Meanwhile, the portion of the visible range A, which does not overlap with the plane mirror 112, is a portion whose background is directly viewed by the viewer through the semitransparent plane mirror 111. FIG. 5(b) is a front view showing a positional relation between the viewer and the pair of parallel plane mirrors 110. As described above, since the visible range A of the viewer is defined in such a manner that the width in the vertical direction is large on the incidence side located at the depth side and the width in the vertical direction is gradually decreased toward the emission side located at the front side, it is not possible to view the image of the blind-spot zone D from the viewpoint 2 even when the planes of the pair of parallel plane mirrors 110 are present in the portion indicated by a hatching in FIG. 5(b). Therefore, when respective planes of the semitransparent plane mirror 111 and the plane mirror 112 are formed in a substantially wedge shape in such a manner that the widths W1, W2 in the vertical direction decrease gradually toward the travel direction of the light L, unnecessary parts are excluded, and thus, it is possible to obtain a small and lightweight blind spot assist device 100. Meanwhile, the magnitude of the widths W1, W2 is properly set, on the basis of the position of the viewpoint 2 and the position of the blind spot assist device 100, or the like, which are expected on the products.

Figure 4:
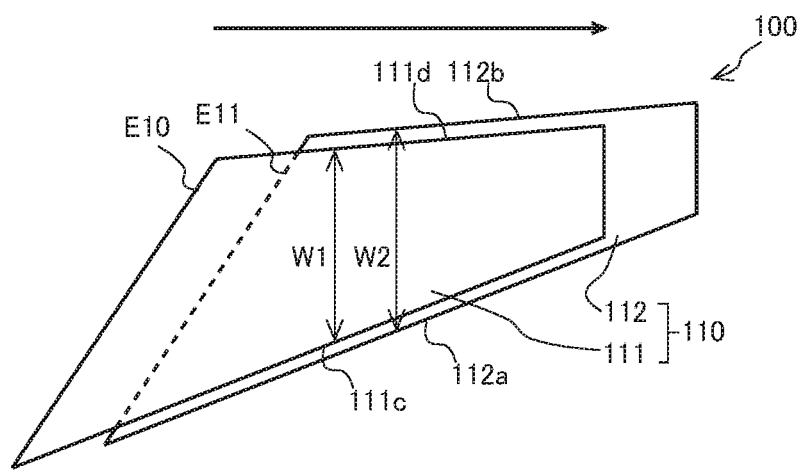
FIG. 4(*a*) is a front view of the blind spot assist device, and FIG. 4(*b*) is a side view thereof.
Figure 4:
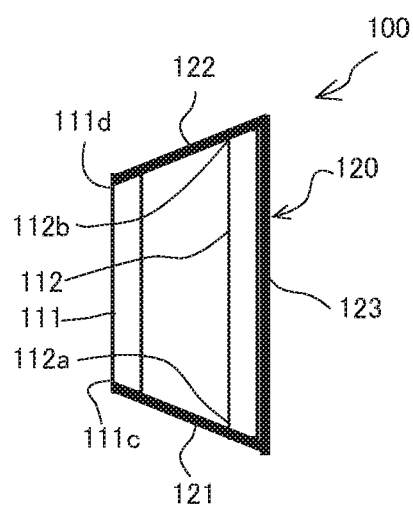

Subsequently, the reason of setting the width W2 in the vertical direction of the plane mirror 112 to be greater than the width W1 in the vertical direction of the semitransparent plane mirror 111 (W2>W1) will be described with reference to FIG. 4.

The viewer places the blind spot assist device 100 at an arbitrary height (height matching the viewpoint 2) of the front pillar 50. In the case where the width W2 in the vertical direction of the plane mirror 112 is equal to or less than the width W1 in the vertical direction of the semitransparent plane mirror 111, the image reflected in the semitransparent plane mirror 111 is viewed in the bottom wall portion 121 or the upper wall portion 122 of the case body 120 when the viewer views the pair of parallel plane mirrors 110 obliquely from above or below. Consequently, there is a case that visibility is impaired. Therefore, the width W2 in the vertical direction of the plane mirror 112 is set to be greater than the width W1 in the vertical direction of the semitransparent plane mirror 111 (W2>W1), so that a lower side portion 112a of the plane mirror 112 protrudes downward from a lower side portion 111c of the semitransparent plane mirror 111 and an upper side portion 112b of the plane mirror 112 protrudes upward from an upper side portion 111d of the semitransparent plane mirror 111. As a result, the bottom wall portion 121 of the case body 120 for holding the semitransparent plane mirror 111 and the plane mirror 112 is inclined downwardly and the upper wall portion 122 thereof is inclined upwardly. In this way, even when the viewer views the pair of parallel plane mirrors 110 at a certain angular position in the vertical direction, the bottom wall portion 121 or the upper wall portion 122 is hardly glared, and hence, it is possible to improve the visibility. Meanwhile, when the glare of only one of the bottom wall portion 121 or the upper wall portion 122 is considered, the lower side portion 112a of the plane mirror 112 may protrude downward from the lower side portion 111c of the semitransparent plane mirror 111, or, the upper side portion 112b of the plane mirror 112 may protrude upward from the upper side portion 111d of the semitransparent plane mirror 111.

The blind spot assist device 100 having the above configuration is adapted to show an image of the blind-spot zone D blocked by an obstacle. The blind spot assist device 100 includes the pair of parallel plane mirrors 110 on which the light L representing the image is incident. The pair of parallel plane mirrors 110 includes the semitransparent plane mirror 111 and the plane mirror 112 opposed to each other. The semitransparent plane mirror 111 is provided on a viewer side for reflecting a part of the light L and transmitting a part of the light L, and the plane mirror 112 reflects the light L to the semitransparent plane mirror 111.

In this way, since the semitransparent plane mirror 111 is used as one of the pair of parallel plane mirrors 110, the viewer can view the scenery and the image of the object M shown on the plane mirror 112 through the semitransparent plane mirror 111. Further, a degree of freedom in arrangement positions of the pair of parallel plane mirrors 110 is increased, so that it is possible to more easily show an image of the blind-spot zone D continuously with an image (the scenery) directly viewed by the viewer. Further, a camera for capturing an image of a blind-spot zone and a display unit for displaying the captured image are not required, and hence, the blind spot assist device is inexpensive, as compared with the case of using both the camera and the display unit.

Further, the semitransparent plane mirror 111 has the base portion 111a facing the plane mirror 112 and the extension portion 111b extending from the base portion 111a.

In this way, the light L from a wide range of the blind-spot zone D can be incident on the extension portion 111b, thereby favorably showing the image of the blind-spot zone D.

Further, the pair of parallel plane mirrors 110 is formed in such a manner that the widths W1, W2 in a direction perpendicular to a travel direction of the light L is gradually decreased toward the travel direction of the light L.

In this way, unnecessary parts are excluded, and hence, size and weight reduction can be achieved.

Further, the plane mirror 112 is formed in such a manner that the width W2 of the plane mirror 112 in the direction perpendicular to the travel direction of the light L in the pair of parallel plane mirrors 110 is greater than the width W1 of the semitransparent plane mirror 111 in the direction perpendicular to the travel direction of the light L in the pair of parallel plane mirrors 110.

In this way, it is possible to improve the visibility from a certain angular position in the vertical direction.

Figure 6:
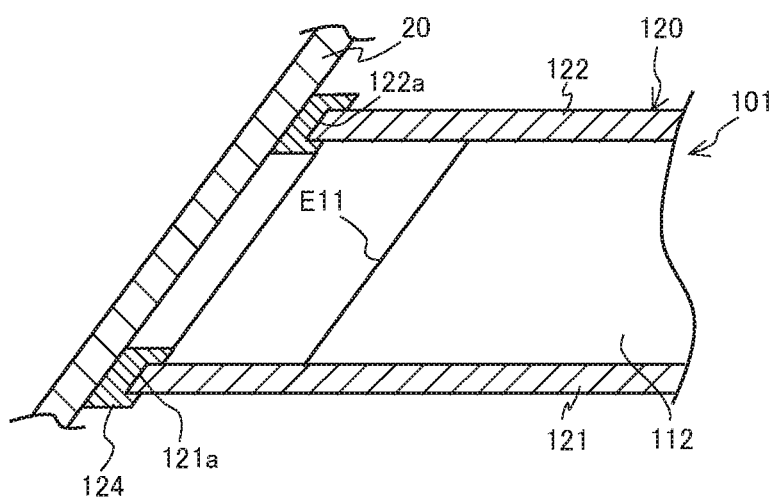
FIG. 6 is a longitudinal sectional view showing a blind spot assist device according to a first modified example of the present invention.

Subsequently, a blind spot assist device according to a first modified example will be described with reference to FIG. 6. Meanwhile, the same or similar parts will be denoted by the same reference numerals as the above-described embodiment, and a detailed description thereof will be omitted. FIG. 6 shows a longitudinal sectional view of a blind spot assist device 101 according to the first modified example.

As shown in FIG. 6, the blind spot assist device 101 according to the first modified example is configured in such a manner that inclined surfaces 121a, 122a along a glass surface of the windshield glass 20 of the vehicle 1 are provided at incidence-side ends of the bottom wall portion 121 and the upper wall portion 122 of the case body 120 for holding the pair of parallel plane mirrors 110. Meanwhile, "the inclined surfaces along the glass surface" may be any surface which is inclined in a direction substantially corresponding to an inclination direction of the glass surface. Further, a ring-shaped cushioning member 124 made of a flexible material such as rubber or sponge is attached so as to cover the inclined surfaces 121a, 122a. In order to fill gaps between the inclined surfaces 121a, 122a and the windshield glass 20 at the time of installing the blind spot assist device 101, the viewer fixes the blind spot assist device 101 to the front pillar 50 in the state of pressing and compressing the cushioning member 124 against the windshield glass 20.

According to this configuration, it is possible to prevent the breakage of the windshield glass 20 or the blind spot assist device 101 and the abnormal noise occurring due to the contact of the windshield glass 20 and the inclined surfaces 121a, 122a when the vehicle 1 is vibrated. Further, since the gaps between the windshield glass 20 and the blind spot assist device 101 are filled by the cushioning member 124, dirt or dust can be prevented from entering between the pair of parallel plane mirrors 110 through the gaps, and the visibility of the blind spot assist device 101 can be maintained for a long time.

Figure 7:
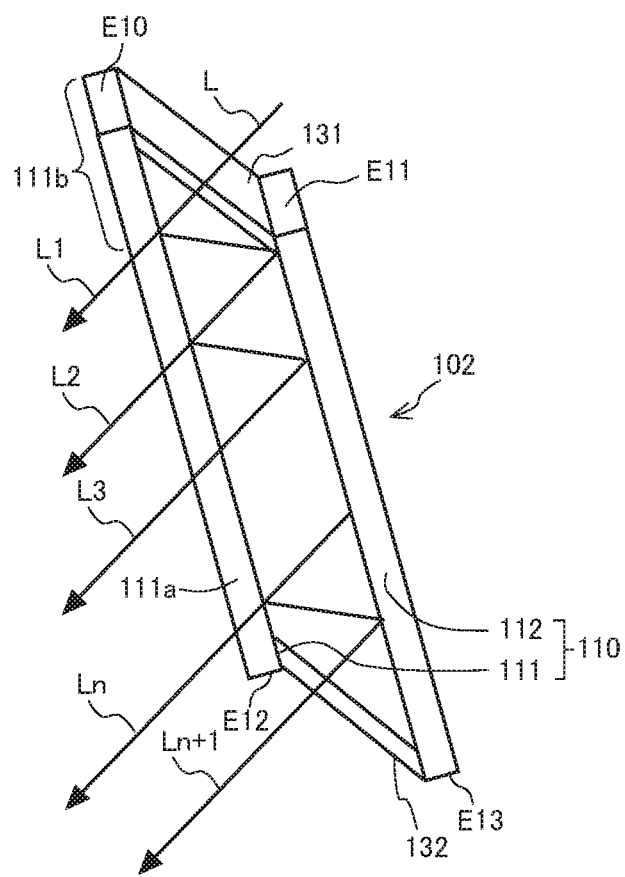
FIG. 7 is a plan view showing a blind spot assist device according to a second modified example of the present invention.

Subsequently, a blind spot assist device according to a second modified example will be described with reference to FIG. 7. Meanwhile, the same or similar parts will be denoted by the same reference numerals as the above-described embodiment, and a detailed description thereof will be omitted. FIG. 7 is a plan view showing a blind spot assist device 102 according to the second modified example.

As shown in FIG. 7, the blind spot assist device 102 according to the second modified example is configured in such a manner that a first transparent plate (the first translucent member) 131 is provided so as to cover between an incidence-side end E10 of the semitransparent plane mirror 111 and an incidence-side end E11 of the plane mirror 112, and a second transparent plate (second translucent member) 132 is provided so as to cover between an emission-side end E12 of the semitransparent plane mirror 111 and an emission-side end E13 of the plane mirror 112. Since the semitransparent plane mirror 111 and the plane mirror 112 are fixed in a parallel positional relation with an interval by being held in the case body 120, the blind spot assist device 102 has a cylindrical shape where openings are formed at the ends on incidence-side and emission-side (the side which is opposite to the incidence side and corresponds to the travel direction side of the light L) of the light L. From the incidence-side opening and the emission-side opening, dirt or dust or the like is liable to enter into the pair of parallel plane mirrors 110, thereby being attached to an inner surface thereof. The dirt or the like attached to the inner surface of the pair of parallel plane mirrors 110 is projected on the image viewed by the viewer. Further, once the dirt or the like enters into the pair of parallel plane mirrors 110, it is difficult to remove the dirt or the like in the state where the blind spot assist device 102 is installed in the vehicle 1. On the contrary, the blind spot assist device 102 is configured in such a manner that the incidence-side opening and the emission-side opening are covered by the first and second transparent plates 131, 132 and, the lower side and the upper side are covered by the bottom wall portion 121 and the upper wall portion 122 of the case body 120. Therefore, the internal space of the pair of parallel plane mirrors 110 is isolated from the outside, and hence, it is possible to prevent the entrance of dirt or the like. Meanwhile, even in the configuration that one of the incidence-side opening or the emission-side opening is covered by the first transparent plate 131 or the second transparent plate 132, an effect of reducing the entrance of dirt or the like can be achieved. However, it is desirable to cover, by the second transparent plate 132, the emission-side opening in contact with a wider space because the effect of reducing the entrance of dirt or the like is increased.

Meanwhile, optically, it is necessary to consider a positional deviation of an image due to the refraction inside the first and second transparent plates 131, 132 and the surface reflection of the first and second transparent plates 131, 132. In either case, it is desirable that light passes at an almost vertical angle. Therefore, most preferably, the first transparent plate 131 is arranged in such a manner that an angle formed by the light L incident on the first transparent plate 131 from the blind-spot zone D and the plane of the first transparent plate 131 is vertical (90°), and the second transparent plate 132 is arranged in such a manner that an angle formed by the light L (light Ln+1) reflected from the plane mirror 112 and incident on the second transparent plate 132 and the plane of the second transparent plate 132 is vertical (90°). However, considering the degree of effect of the positional deviation due to the refraction and the surface reflection, it is possible to obtain substantially the same performance as in the vertical state even when the angle falls within a range (90±30°) of 30° from the vertical state. Further, in order to reduce the positional deviation due to the refraction, it is preferable that the plate thickness of the first and second transparent plates 131, 132 is thin, for example, 2 mm or less.

Figure 8:
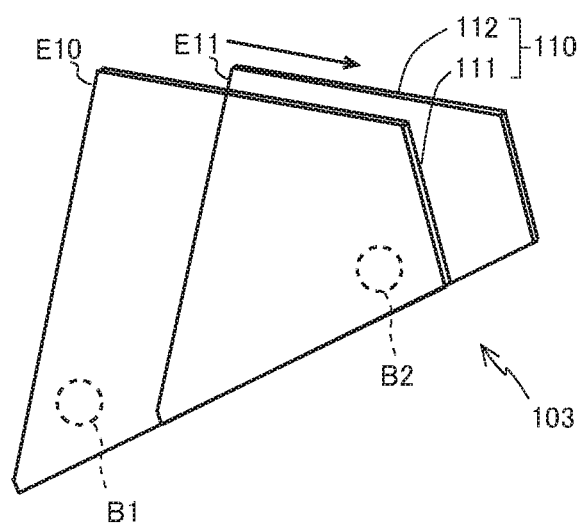
FIG. 8 is a perspective view showing a blind spot assist device according to a third modified example of the present invention.

Subsequently, a blind spot assist device according to a third modified example will be described with reference to FIG. 8 to FIG. 10. Meanwhile, the same or similar parts will be denoted by the same reference numerals as the above-described embodiment, and a detailed description thereof will be omitted. FIG. 8 is a perspective view showing a blind spot assist device 103 according to the third modified example.

In the blind spot assist device 103 according to the third modified example, the semitransparent plane mirror 111 has a first portion and a second portion whose transmittance is higher than that of the first portion. Specifically, the semitransparent plane mirror 111 is formed in such a manner that a metal such as aluminum is deposited on a surface of a substrate made of, for example, a translucent resin material such as polyethylene terephthalate, polycarbonate, polyethylene and acrylic to form a semitransparent reflective layer (the first portion, the semitransparent reflective portion) having a desired reflectivity, and the semitransparent reflective layer is partially removed to form a plurality of fine opening portions (the second portion, the transmissive portion) which has a transmittance higher than the semitransparent reflective layer and is formed in a patterned shape and a size that cannot be recognized by a viewer. Since two portions with different transmittances are formed, it is possible to accurately adjust the reflectivity (transmittance) of the semitransparent plane mirror 111. Meanwhile, the semitransparent plane mirror 111 may be formed by coating a dielectric multilayer film on the surface of the substrate. Further, the semitransparent plane mirror 111 of the blind spot assist device 103 is formed in such a manner that the transmittance is increased step by step toward the travel direction (indicated by an arrow in FIG. 8) of the light L in the pair of parallel plane mirrors 110.

Subsequently, the reason of forming the semitransparent plane mirror 111 in such a manner that the transmittance is increased step by step toward the travel direction of the light L in the pair of parallel plane mirrors 110 will be described with reference to FIG. 9. Meanwhile, FIG. 9 is a view of the blind spot assist device 103, as seen from the upper front.

As described above, the light L from the blind-spot zone D is repeatedly reflected between the pair of parallel plane mirrors 110 and a portion thereof is emitted from the semitransparent plane mirror 111 to reach the viewpoint 2. Therefore, the image, which is viewed by the viewer through the semitransparent plane mirror 111, is formed by a plurality of continuous images where the number of reflections in the semitransparent plane mirror 111 is different from each other.

Figure 9:
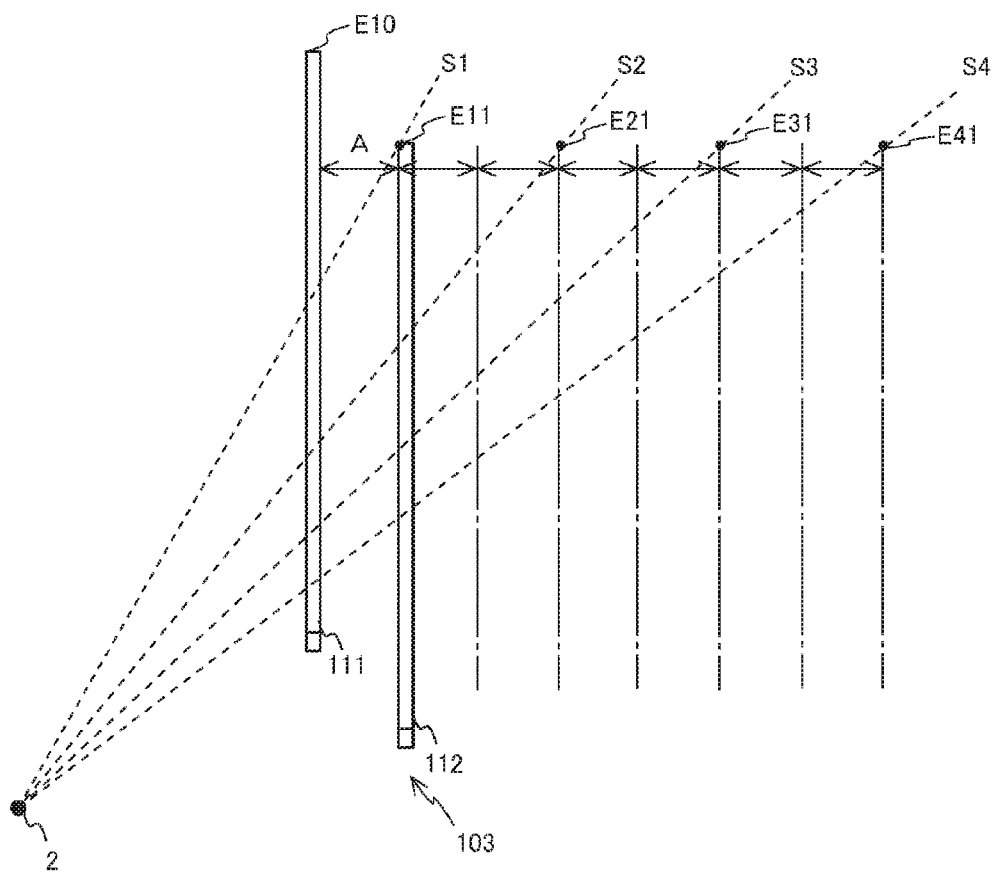
FIG. 9 is a view showing the blind spot assist device.
Figure 10:
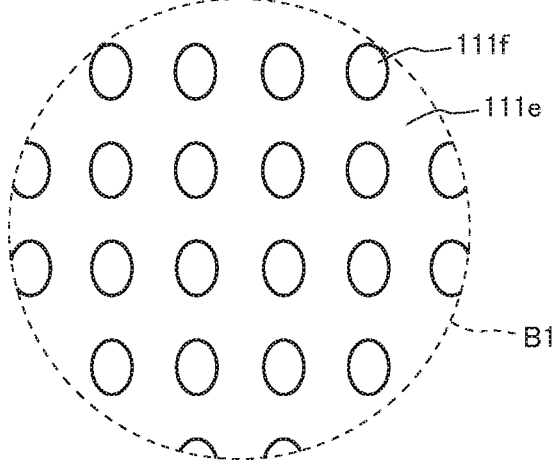
FIG. 10 is a partial enlarged view showing a semitransparent plane mirror of the blind spot assist device.
Figure 10:
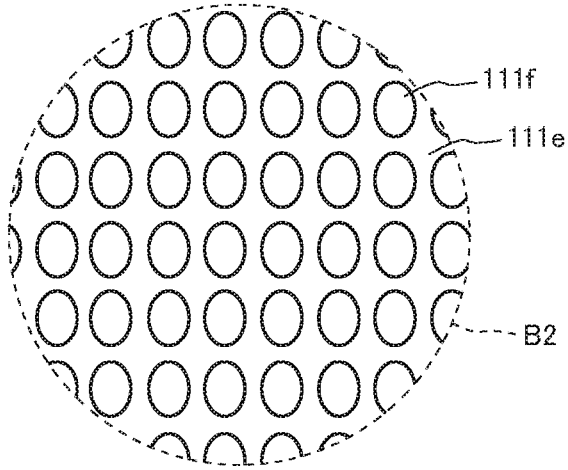

For example, as shown in FIG. 9, in the pair of parallel plane mirrors 110, a range up to a straight line S1 connecting the viewpoint 2 and the incidence-side end E11 is an area where a background is viewed through the semitransparent plane mirror 111 as seen from the viewpoint 2 (for the first time). Further, a range from the straight line S1 up to a straight line S2 connecting the viewpoint 2 and a point E21 is an area of an image viewed when the light L is reflected in the order of the semitransparent plane mirror 111 and the plane mirror 112, and then, is incident on the semitransparent plane mirror 111 again (for the second time). Here, the point E21 is a point that is displaced from the incidence-side end E11 by twice an interval A between the semitransparent plane mirror 111 and the plane mirror 112 in the direction perpendicular to the planes of the pair of parallel plane mirrors 110. Further, a range from the straight line S2 up to a straight line S3 connecting the viewpoint 2 and a point E31 is an area of an image viewed when the light L is reflected in the order of the semitransparent plane mirror 111 and the plane mirror 112, and then, is incident on the semitransparent plane mirror 111 again (for the third time). Here, the point E31 is a point that is further displaced from the point E21 by twice the interval A in the direction perpendicular to the planes of the pair of parallel plane mirrors 110. Further, a range from the straight line S3 up to a straight line S4 connecting the viewpoint 2 and a point E41 is an area of an image viewed when the light L is reflected in the order of the semitransparent plane mirror 111 and the plane mirror 112, and then, is incident on the semitransparent plane mirror 111 again (for the fourth time). Here, the point E41 is a point that is further displaced from the point E31 by twice the interval A in the direction perpendicular to the planes of the pair of parallel plane mirrors 110.

Here, when no measures are taken, the brightness of the light L emitted from the pair of parallel plane mirrors 110 is decreased as the number of reflections in the semitransparent plane mirror 111 is increased. Therefore, as the number of reflections in the semitransparent plane mirror 111 is increased, the image becomes darker. As a result, the image viewed from the viewpoint 2 becomes gradually darker from the incidence side toward the travel direction of the light L in the pair of parallel plane mirrors 110.

Further, since the light L from the object M is repeatedly reflected between the pair of parallel plane mirrors 110, n lights L representing the image of the object M are emitted from a single parallel plane mirror 110 when the light L is incident n times on the semitransparent plane mirror 111. That is, the light L representing n images of the object M is emitted along the left and right directions of the viewpoint 2 from the pair of parallel plane mirrors 110. Therefore, the viewer can view the image of the object M over a wide range in the left and right direction. However, when no measures are taken, the brightness of the light L emitted from the pair of parallel plane mirrors 110 is decreased as the number of reflections in the semitransparent plane mirror 111 is increased, and hence, the image becomes darker. Therefore, the brightness of the image changes when the viewpoint 2 is displaced in the left and right directions.

On the other hand, the present inventors have led to the thought that the brightness of the image to be viewed becomes uniform by partially varying the transmittance (reflectivity) of the semitransparent plane mirror 111. FIG. 10(*a*) shows an incidence-side area B1 (the area up to the straight line S1 shown in FIG. 9) of the semitransparent plane mirror 111 in FIG. 8, and FIG. 10(*b*) shows an emission-side area B2 (the side opposite to the incidence side, the area from the straight line S3 up to the straight line S4 shown in FIG. 9) thereof. As shown in FIG. 10, the semitransparent plane mirror 111 is provided on its plane (the semitransparent surface) with a semitransparent reflective layer (a semitransparent reflective portion) 111*e* having a desired reflectivity and a plurality of fine opening portions (the transmissive portion) 111*f* which is formed in a patterned shape on the semitransparent reflective layer 111*e*. Further, an opening ratio (a ratio of the entire area of the opening portions 111*f* relative to the entire plane area) of the opening portions 111*f* in the emission-side area B2 is greater than that in the incidence-side area B1. That is, the semitransparent plane mirror 111 is formed in such a manner that the opening ratio of the opening portions 111*f* is increased step by step toward the travel direction of the light L in the pair of parallel plane mirrors 110, and hence, the transmittance of the light L is increased step by step toward the travel direction of the light L in the pair of parallel plane mirrors 110. In this way, since the transmittance of the light L is low (the reflectivity is high) on the incidence side and the transmittance of the light L is high on the emission side, the decrease in the brightness due to the reflection in the semitransparent plane mirror 111 is compensated, and thus, the brightness of the image to be viewed can be uniform. Meanwhile, although only the incidence-side area B1 and the emission-side area B2 are shown in FIG. 10, it is desirable to vary the transmittance of the light L for each area where the number of reflections in the semitransparent plane mirror 111 of the image viewed from the viewpoint 2 defined as a reference viewpoint position in the semitransparent plane mirror 111 is different from each other. Further, the transmittance in each area is properly determined in consideration of the relation with the brightness of the light L at initial incidence in such a manner that the brightness of the image to be viewed in each area becomes uniform.

As described above, the blind spot assist device 103 is configured in such a manner that the semitransparent plane mirror 111 has the first portion (the semitransparent reflective layer 111*e*) and the second portion (the opening portions 111*f*) whose transmittance is higher than that of the first portion.

In this way, two portions with different transmittances are formed, and hence, the transmittance of the semitransparent plane mirror 111 can be accurately adjusted, so that it is possible to improve the visibility. Meanwhile, the reflective layer (the reflective portion) may be formed as the first portion of the present invention. Further, the semitransparent reflective layer (the semitransparent reflective portion) may be formed as the second portion of the present invention. When both the first portion and the second portion are formed as the semitransparent reflective layer, the semitransparent reflective layer as the second portion is formed so as to have the transmittance higher than that of the semitransparent reflective layer as the first portion.

Further, the semitransparent plane mirror 111 is formed in such a manner that the transmittance of light is increased step by step toward the travel direction of the light L in the pair of parallel plane mirrors 110.

According to this configuration, since the transmittance of the semitransparent plane mirror 111 is gradually increased toward the travel direction of the light L, the brightness of the image to be viewed becomes uniform, and thus, it is possible to improve the visibility.

Further, the semitransparent plane mirror 111 is configured in such a manner that the ratio (the opening ratio) of the second portion (the opening portions 111*f*) is increased step by step toward the travel direction of the light L in the pair of parallel plane mirrors 110.

According to this configuration, it is possible to easily adjust the transmittance of the semitransparent plane mirror 111 by the ratio of the opening portions 111*d*.

Meanwhile, the present invention is not limited by the above embodiments and drawings. Of course, modifications (including the deletion of components) can be applied to the above embodiments and drawings. The blind spot assist devices 100, 101, 102, 103 of the present embodiment are arranged in the right front pillar 50, as seen from a driver's seat side of the vehicle 1. However, the same blind spot assist devices may be also arranged in the left front pillar 60. Further, the blind spot assist device may be placed at a center pillar or a rear pillar or the like, which is an obstacle of a vehicle, in addition to the front pillars. In this way, the blind spot assist device may show an image of a blind-spot zone blocked by these obstacles. Further, in the present embodiment, a portion between the pair of parallel plane mirrors 110 is a hollow space. However, for example, a transparent resin material (the translucent member) may be filled between the pair of parallel plane mirrors 110, thereby employing a solid structure. In this way, dust or dirt or the like can be prevented from being attached to an inner surface of the pair of parallel plane mirrors 110. Further, in the blind spot assist device 103, the opening portions 111f, which are the second portion, are formed in a patterned shape. However, the semitransparent reflective layer 111e or the reflective layer, which is the first portion, may be formed in a patterned shape. Further, although the shape of the opening portions 111f is an elliptical shape, the shape of the opening portions 111f may be a circular shape or a rectangular shape, etc.

Further, also in a non-vehicle field, the present invention can be widely applied as a blind spot assist device for showing an image of a blind-spot zone blocked by an obstacle. For example, in the case of using the blind spot assist device of the present invention in a house, the blind spot assist device having a large area is attached to a ceiling and only an incidence portion is exposed to the outside of the house from a wall or the like. In this way, it is possible to see the state of the sky by the blind spot assist device on the ceiling while staying on the inside of the house, and, it is also possible to direct the sunlight to the inside of the house from the ceiling. The present invention is especially suitable for a dense residential areas or a house where a typical window cannot be mounted.

Further, for example, in the high-rise buildings such as tourist facilities, a blind spot assist device having a large area is buried under the floor of a high-rise floor and only a light incidence portion is exposed to the outside of the building. In this way, the landscape below the eyes can be directly felt underfoot by the blind spot assist device under the floor, thereby emphasizing the height of the building. In order to achieve the same effect, conventionally, it is necessary to provide a space below the floor. However, since the blind spot assist device of the present invention can be easily placed also in an existing building, the present invention is suitable for the existing building.

In addition, as an example of using the blind spot assist device on a wall surface, the blind spot assist device of the present invention can be placed at a corner of a fence in a bad-outlook intersection where the fence stands close to a road. In this way, it is possible to quickly recognize the presence of a vehicle or a pedestrian in a blind-spot zone, thereby contributing the prevention of crossing accidents.

As described above, according to the blind spot assist device of the present invention, energy such as electric power is not required, and a blind-spot zone, which is blocked by an obstacle and cannot be viewed up to now, can be viewed simply by securing a space for a light incidence portion, as if the blind-spot zone is viewed through the obstacle over a wide range. The applications of the present invention can be widely applied regardless of indoor and outdoor. The present invention can achieve various effects such as health, safety or impression.

INDUSTRIAL APPLICABILITY

The present invention is suitable for a blind spot assist device that shows an image of a blind-spot zone blocked by an obstacle.

REFERENCE SIGNS LIST

1: Vehicle
2: Viewpoint
100, 101, 102, 103: Blind Spot Assist Device
110: A Pair of Parallel Plane Mirrors (A Pair of Mirrors)
111: Semitransparent Plane Mirror (Semitransparent Mirror)
111a: Base Portion
111b: Extension Portion
111c: Lower Side portion
111d: Upper Side Portion
111e: Semitransparent Reflective Layer
111f: Opening Portion
112: Plane Mirror (Mirror)
112a: Lower Side portion
112b: Upper Side Portion
120: Case Body
121: Bottom Wall Portion
122: Upper Wall Portion
123: Side Wall Portion
124: Cushioning Member
131: First Transparent Plate (First Translucent Member)
132: Second Transparent Plate (Second Translucent Member)

The invention claimed is:

1. A blind spot assist device for showing an image of a blind-spot zone blocked by an obstacle, the blind spot assist device comprising:
  a semitransparent mirror comprising a first end having a first length and a second end having a second length, the first end and the second end opposing each other, the first length of the first end being different from the second length of the second end; and
  a mirror disposed to face the semitransparent mirror to allow a light representing the image to transmit between the semitransparent mirror and the mirror and to provide the image through the semitransparent mirror, wherein
  the semitransparent mirror 1) receives, at a first portion of the semitransparent mirror, the light representing the image, 2) reflects a first part of the light at the first portion of the semitransparent mirror, and 3) transmits a second part of the light through the first portion of the semitransparent mirror,
  the mirror 1) receives the first part of the light reflected from the first portion of the semitransparent mirror and 2) reflects the first part of the light towards a second portion of the semitransparent mirror,
  the semitransparent mirror receives, at the second portion of the semitransparent mirror, the first part of the light reflected from the mirror,
  the first portion of the semitransparent mirror has a first transmittance,
  the second portion of the semitransparent mirror has a second transmittance, and
  the second transmittance of the second portion is higher than the first transmittance of the first portion.

2. The blind spot assist device according to claim 1, wherein
  the light representing the image is initially incident at the first end of the semitransparent mirror, and
  the first length of the first end of the semitransparent mirror is greater than the second length of the second end of the semitransparent mirror.

3. The blind spot assist device according to claim 1, wherein
  the mirror comprises a third end having a third length and a fourth end having a fourth length, the third end and the fourth end opposing each other, the third length of the third end being different from the fourth length of the fourth end, the third end of the mirror faces the first end of the semitransparent mirror, the fourth end of the mirror faces the second end of the semitransparent mirror, and the third length of the third end of the mirror is greater than the fourth length of the fourth end of the mirror.

4. The blind spot assist device according to claim 3, further comprising a first translucent member disposed between the first end of the semitransparent mirror and the third end of the mirror and/or a second translucent member disposed between the second end of the semitransparent mirror and the fourth end of the mirror.

5. The blind spot assist device according to claim 1, further comprising a case body for holding the semitransparent mirror and the mirror, wherein a cushioning member is provided on an incidence-side end of the case body.

6. The blind spot assist device according to claim 1, wherein the first portion of the semitransparent mirror is disposed at the first end of the semitransparent mirror, and the second portion of the semitransparent mirror is disposed at the second end of the semitransparent mirror.

7. The blind spot assist device according to claim 1, wherein the first portion is a reflective portion or a semitransparent reflective portion, and the second portion is a semitransparent reflective portion or a transmissive portion.

* * * * *